United States Patent
Gounder et al.

(10) Patent No.: US 11,851,337 B2
(45) Date of Patent: Dec. 26, 2023

(54) MFI ZEOLITES USING DABCO AND METHYLAMINE REAGENTS

(71) Applicant: PURDUE RESEARCH FOUNDATION, West Lafayette, IN (US)

(72) Inventors: Rajamani Gounder, West Lafayette, IN (US); Claire Townsend Nimlos, Lakewood, CO (US); Byung Jin Lee, Seoul (KR)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 4 days.

(21) Appl. No.: 17/462,597

(22) Filed: Aug. 31, 2021

(65) Prior Publication Data

US 2022/0064012 A1    Mar. 3, 2022

Related U.S. Application Data

(60) Provisional application No. 63/072,803, filed on Aug. 31, 2020.

(51) Int. Cl.
*C01B 39/48* (2006.01)

(52) U.S. Cl.
CPC .......... *C01B 39/48* (2013.01); *C01P 2006/12* (2013.01)

(58) Field of Classification Search
None
See application file for complete search history.

(56) References Cited

U.S. PATENT DOCUMENTS

| 4,780,436 A | | 10/1988 | Raatz et al. | |
| 6,004,527 A | * | 12/1999 | Murrell | C01B 39/38 423/328.2 |
| 2016/0115039 A1 | | 4/2016 | Okubo et al. | |

FOREIGN PATENT DOCUMENTS

| EP | 0419334 A1 | 3/1991 |
| WO | 2011-095140 | 8/2011 |

OTHER PUBLICATIONS

International Search Report and Written Opinion for International Application No. PCT/US2021/048424 dated Jan. 26, 2022.
"The Leading Role of Association in Framework Modification of Highly Siliceous Zeolites with Absorbed Methylamine"; Han et al.; ChemPhysChem, vol. 7, No. 3, Mar. 3, 2006.

* cited by examiner

*Primary Examiner* — Sheng H Davis
(74) *Attorney, Agent, or Firm* — Edmonds & Cmaidalka, P.C.

(57) ABSTRACT

An oligomerization catalyst, oligomer products, methods for making and using same. The catalyst is synthesized MFI zeolite (ZSM-5) made from a combination of DABCO and methylamine (MEA) in the presence of Na cations.

7 Claims, 7 Drawing Sheets

MFI ZEOLITES USING DABCO AND METHYLAMINE REAGENTS

CROSS-REFERENCE TO RELATED APPLICATIONS

This application claims priority to U.S. Provisional Patent Application having Ser. No. 63/072,803, filed on Aug. 31, 2020. The entirety of which is incorporated by reference herein.

GOVERNMENT LICENSE RIGHTS

This invention was made with government support under Cooperative Agreement No. EEC-1647722 awarded by the National Science Foundation. The government has certain rights in the invention.

FIELD OF THE INVENTION

Embodiments provided relate to zeolites. More particularly, embodiments provided herein relate to MFI (ZSM-5) zeolites useful for olefin oligomerization.

BACKGROUND OF THE INVENTION

Zeolites are crystalline microporous aluminosilicates that are widely used as acid catalysts in the petrochemical and refining industries to convert carbon feedstocks to chemicals and fuels, because they provide control over reaction networks (e.g., via shape selectivity and confinement effects) that arise from differences in crystal framework topology (i.e., pore size and connectivity) and crystallite size. Zeolites with the MFI framework topology provide shape-selective properties that are particularly useful for the conversion of methanol-to-olefins, gasoline, and hydrocarbons (MTO, MTG, MTH), and are particularly useful for the selective cracking of linear paraffins that allows its use as an additive to fluid catalytic cracking catalysts (i.e., FAU-type zeolites) to produce gasoline with higher octane rating.

Zeolites with the MFI framework topology are also particularly useful for olefin oligomerization reactions to gasoline and distillate fuels, among other processes. Light olefin oligomerization is a promising pathway to produce higher molecular weight hydrocarbons for transportation fuels. Solid acids including supported phosphoric acid, acid resins, amorphous silica-alumina, and zeolites have been used in industrial oligomerization processes, with MFI zeolites garnering the most attention for these reactions due to its resistance to coke formation and high selectivity to linear olefins. MFI is used in the Mobil Olefins to Gasoline and Distillate (MOGD) process.

Zeolites contain tetrahedral silicon atoms linked by oxygen, forming charge-neutral crystalline structures. Substitution of Si by Al provides a negative charge in the lattice, which is compensated by cations. When the cation is a proton, strong Brønsted acid sites are created, which can be used in catalytic transformations, like cracking, oligomerization, and many other reactions. MFI zeolites are most often synthesized using an aqueous basic solution of silica, alumina and structure-directing agents (SDA), often with tetrapropylammonium as the primary organic SDA (OSDA) and optionally with Na as a co-SDA, leading to an arbitrary and random distribution of Al sites throughout the zeolite lattice. As a result of the random nature of Al substituted in the zeolite structure, both isolated and paired Brønsted acid sites are formed. The fraction of paired sites is dependent on the Al content and can be determined on a zeolite sample by $Co^{+2}$ ion exchange, which selectively exchanges with paired Al sites. For several catalysis and adsorption applications, it is desirable to control the distribution of isolated versus paired Brønsted acid sites, given that this parameter affects catalytic rates of hydrocarbon cracking, product distributions formed from olefin oligomerization and alkane cracking, different adsorption behavior for $CO_2$, alkanes, and water, and hydrothermal stability.

For olefin oligomerization, the desired reactions to convert monomer reactant olefins into heavier molecular weight oligomers is also accompanied by undesired cracking (β-scission) reactions to form smaller hydrocarbons from product oligomers. High selectivity is therefore achieved by preferentially suppressing cracking reactions relative to oligomerization. Material properties that affect the product distribution of olefin oligomerization in MFI include local aluminum proximity and the interplay between crystal size and bulk aluminum content.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. It is emphasized that the figures are not necessarily to scale and certain features and certain views of the figures can be shown exaggerated in scale or in schematic for clarity and/or conciseness.

DETAILED DESCRIPTION

Figure 1:
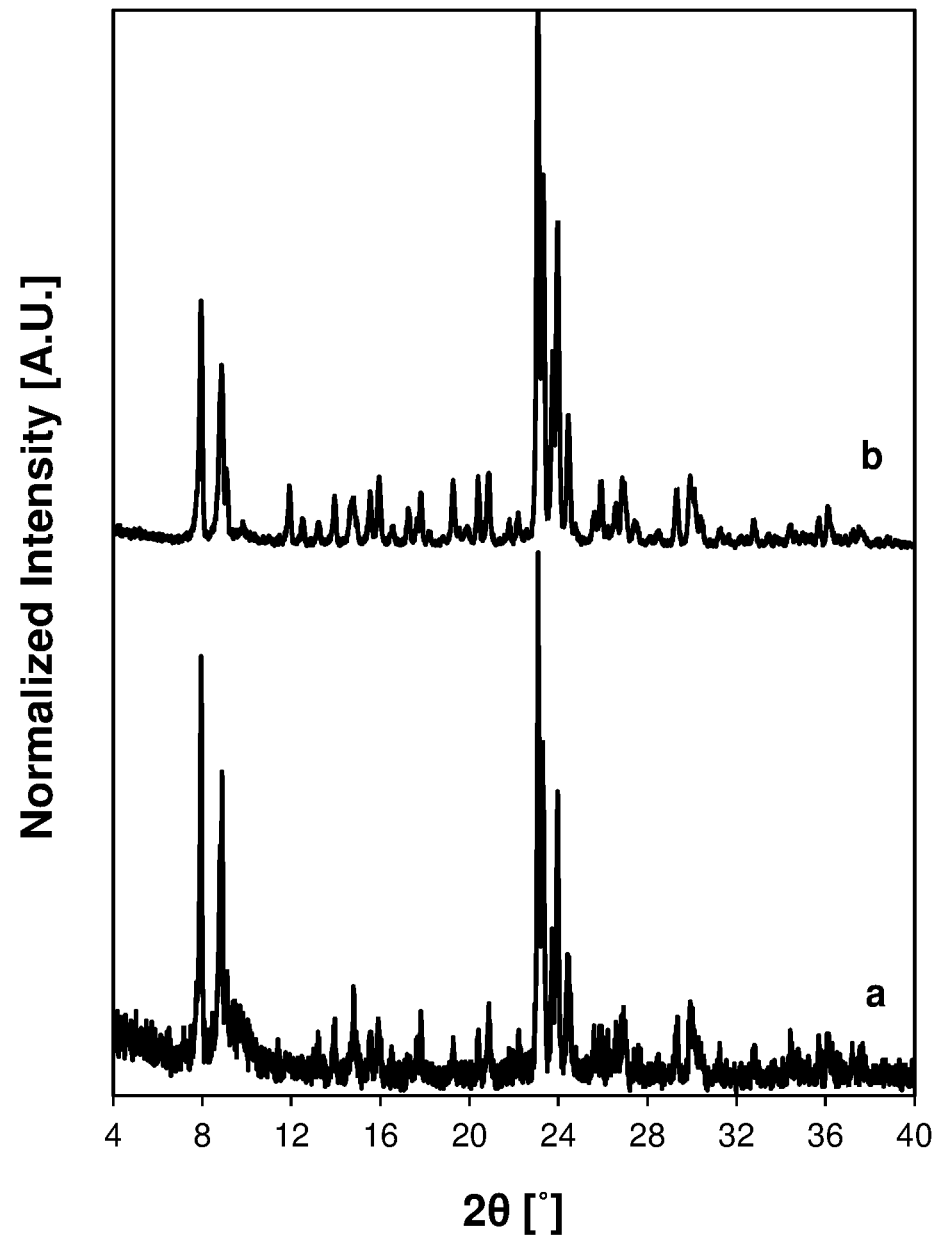
FIG. 1 shows the XRD pattern for two MFI samples crystallized with DABCO, methylamine, and Na present (Samples 4 and 5).

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure can repeat reference numerals and/or letters in the various embodiments and across the figures provided herein. This repetition is for the purpose of simplicity and clarity and does not in itself dictate a relationship between the various embodiments and/or configurations. Moreover, the exemplary embodiments presented below can be combined in any combination of ways, i.e., any element from one exemplary embodiment can be used in any other exemplary embodiment, without departing from the scope of the disclosure.

Additionally, certain terms are used throughout the following description and claims to refer to particular components. As one skilled in the art will appreciate, various entities can refer to the same component by different names, and as such, the naming convention for the elements described herein is not intended to limit the scope of the invention, unless otherwise specifically defined herein. Further, the naming convention used herein is not intended to distinguish between components that differ in name but not function.

Furthermore, in the following discussion and in the claims, the terms "including" and "comprising" are used in an open-ended fashion, and thus should be interpreted to mean "including, but not limited to." The phrase "consisting essentially of" means that the described/claimed composition does not include any other components that will materially alter its properties by any more than 5% of that property, and in any case does not include any other component to a level greater than 3 mass %.

Unless otherwise indicated, all numerical values are "about" or "approximately" the indicated value, meaning the values take into account experimental error, machine tolerances and other variations that would be expected by a person having ordinary skill in the art. It should also be understood that the precise numerical values used in the specification and claims constitute specific embodiments. Efforts have been made to ensure the accuracy of the data in the examples. However, it should be understood that any measured data inherently contains a certain level of error due to the limitation of the technique and/or equipment used for making the measurement.

The term "or" is intended to encompass both exclusive and inclusive cases, i.e., "A or B" is intended to be synonymous with "at least one of A and B," unless otherwise expressly specified herein.

The indefinite articles "a" and "an" refer to both singular forms (i.e., "one") and plural referents (i.e., one or more) unless the context clearly dictates otherwise. For example, embodiments using "an olefin" include embodiments where one, two, or more olefins are used, unless specified to the contrary or the context clearly indicates that only one olefin is used.

The terms "alkane" and "paraffin" are used interchangeably and both refer to any saturated molecule containing hydrogen and carbon atoms only, in which all the carbon-carbon bonds are single bonds and are saturated with hydrogen. Such saturated molecules can be linear, branched, and/or cyclic.

The terms "alkene" and "olefin" are used interchangeably and both refer to any unsaturated molecule containing hydrogen and carbon atoms only, in which one or more pairs of carbon atoms are linked by a double bond. Such unsaturated molecules can be linear, branched, or cyclic, and can include one, two, three or more pairs of carbon atoms linked by double bounds (i.e. mono-olefins, di-olefins, tri-olefins, etc).

The term "wt %" means percentage by weight, "vol %" means percentage by volume, "mol %" means percentage by mole, "ppm" means parts per million, and "ppm wt" and "ppmw" are used interchangeably and mean parts per million on a weight basis. All concentrations herein, unless otherwise stated, are expressed on the basis of the total amount of the composition in question.

Each of the appended claims defines a separate invention, which for infringement purposes is recognized as including equivalents to the various elements or limitations specified in the claims. Depending on the context, all references to the "invention" may in some cases refer to certain specific embodiments only. In other cases, it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this disclosure is combined with publicly available information and technology.

A detailed description of the MFI zeolites and methods for making and using the same will now be provided. It has been unexpectedly and surprisingly discovered that the combination of DABCO and methylamine (MEA) can be used to synthesize MFI zeolites, also known as ZSM-5 catalyst. It has also been unexpectedly and surprisingly discovered that the resulting MFI zeolites contain a higher content of isolated framework Al atoms than MFI samples of similar bulk composition synthesized with $TPA^+$ alone or $TPA^+$/$Na^+$, which are the benchmark in the oil and gas industry. The ability to synthesize a higher content of isolated framework Al atoms is significant because the presence of isolated Al atoms is desirable for certain catalytic and adsorption applications, such as olefin oligomerization.

Unexpectedly, it has been determined that MFI zeolites can be synthesized when 1,4-diazabicyclo[2.2.2]octane ("DABCO") and methylamine ("MEA") are added to aqueous $Na^+$-containing aluminosilicate gels used for zeolite crystallization. Various DABCO derivatives also can be used, including but not limited to: 4-aza,1-azonioabicyclo[2.2.2]octante, 1-methyl; 4-aza, 1-azonioabicyclo[2.2.2]octane, 1,3-dimethyl; 4-aza, 1-azonioabicyclo[2.2.2]octane, 1,2,5-trimethyl, and 1,1'-alkylenedi(4-aza-1-azonia-2,5-dimethylbicyclo[2.2.2]octane. The DABCO molecule itself is more preferred because the ability to synthesize MFI zeolites starting with DABCO as a reagent, instead of a molecular derivative of DABCO (which requires additional chemical reactions and separation/purification to obtain) can lower the cost of zeolite preparation significantly, as the costs associated with preparing the organic structure directing agent ("OSDA" or simply "SDA") molecules are often the most expensive part of commercial manufacture of zeolite catalysts. Nevertheless, the DABCO derivates are viable, albeit more expensive, options.

It has also be unexpectedly discovered that MFI zeolites synthesized using DABCO and MEA as co-SDAs contain significantly fewer paired Al (and thus, fewer paired Brønsted acid sites) in the resulting zeolite, as compared to traditional MFI zeolites (of similar bulk Si/Al composition) that are synthesized with the usual tetrapropylammonium (TPA). Therefore, the zeolites synthesized according to the present invention contain predominantly isolated Brønsted acid sites and are expected to be significantly more selective for olefin oligomerization with lesser extents of cracking of the higher molecular weight products. Thus, these DABCO/ methylamine-synthesized MFI zeolites are particularly suitable for olefin oligomerization.

The term "oligomerization" refers to the formation of an oligomer from molecules of lower relative molecular mass. The term "oligomer" refers to dimers, trimers, tetramers, and other molecular complexes having less than 26 repeating units. Oligomers provided herein are typically gases or liquids at ambient temperature, and can include low melting solids, including waxes, at ambient temperature. In some embodiments, the oligomers provided herein can have an atomic weight or molecular weight of less than 10,000 AMU (Da), such as about 5,000 or less, 1,000 or less, 500 or less, 400 or less, 300 or less, or 200 or less. The molecular weight of the oligomer, for example, can range from a low of about 50, 250 or 350 to a high of about 500, 3,000, 7,000, or 9,000 AMU (Da).

The MFI zeolite can be synthesized using conventional techniques for synthesizing MFI (ZSM-5) zeolites except that DABCO (and/or one or more DABCO derivatives) and MEA are used as co-OSDAs. According to one or more embodiments, the MFI zeolites synthesized with DABCO and MEA can be prepared by adding a source of DABCO, MEA and Na to water to form an aqueous solution; homogenizing the aqueous solution for a first time period; adding a source of aluminum to the homogenized aqueous solution to form an intermediate agent and homogenizing the intermediate agent for a second time period to form an aluminum-containing intermediate agent; adding a source of silicon to the aluminum-containing intermediate agent to form an aluminosilicate-containing intermediate agent and homogenizing the aluminosilicate-containing intermediate agent for a third time period to form a synthesis gel; subjecting the synthesis gel to a crystallization process to crystallize a MFI zeolite; and then recovering the solids (e.g., by centrifugation) followed by washing, drying and a high temperature air calcination treatment and subsequent ion-exchange treatments to remove any unreacted reagents or SDA compounds, thereby recovering the acid-form zeolite.

The amount of DABCO per gram of silica can range from a low of about 0.1 gr, 0.2 gr, or 0.3 gr to a high of about 0.6 gr, 0.8 gr, or 1.0 gr. The DABCO/Si ratio can also range from about 0.2 to about 1.0; about 0.3 to about 0.9; about 0.3 to about 0.8; about 0.2 to about 0.8; about 0.2 to about 0.7; about 0.3 to about 0.6. The DABCO/Si ratio can also range from about 0.5 to about 0.80; 0.50 to about 0.80; or about 0.3 to about 0.70.

The amount of MEA per gram of silica can range from a low of about 0.10 gr, 0.15 gr, 0.30 gr, 0.40 gr, or 0.60 gr to a high of about 0.80 gr, 1.00 gr, 1.50 gr, or 2.00 gr. The MEA/Si ratio can also range from about 0.10 to about 1.90; about 0.15 to about 1.80; about 0.15 to about 1.70; about 0.20 to about 1.65; about 0.50 to about 1.55; and about 0.50 to about 1.65. The MEA/Si ratio can also range from about 1.40 to about 1.50; 1.32 to about 1.48; or about 0.15 to about 1.00.

The amount of $Na_2O$ per gram of silica can range from a low of about 0.0001 gr, 0.00077 gr, 0.0015 gr, 0.031 gr, 0.062 gr, to a high of about 0.12 gr.

The amount of $Al_2O_3$ per gram of silica can range from a low of 0.014 gr, 0.018 gr, 0.024 gr, 0.030 gr, 0.045 gr, 0.091 gr to a high of about 0.15 gr. In another embodiment, the Si:Al ratio can range from a low of about 10, 20, 30 or 40 to high of about 50, 80, 100, or 200.

The source of aluminum can be aluminum hydroxide, aluminum nitrate, aluminosilicate, and any combinations or derivatives thereof.

The source of silicon can be colloidal silica, a silicon alkoxide compound, fumed silica, amorphous silica, aluminosilicate, and any combinations or derivatives thereof.

Each of first, second and third time periods can be the same or different, and each can range from about 1 second to about 48 hours; or about 1 to about 20 hrs; or about 2 to about 10 hrs; or about 3 to about 8 hrs; or about 3 to about 5 hrs; or about 3 to about 4 hrs.

The crystallization process preferably occurs at about 130° C. to about 150° C., but can range from as low of about 60° C., 70° C., 80° C. or 90° C. to a high of about 150° C., 180° C., 200° C. or 240° C. The crystallization process can also take place at about 100° C., 130° C., 140° C., 150° C., 160° C., 170° C., or 180° C.

The high temperature air calcination treatment can occur at about 450 to about 550° C. The air calcination treatment but can also range from as low of about 400° C., 410° C., or 420° C. to a high of about 500° C., 550° C. or 600° C.

The support material can have a surface area in the range of from about 10 $m^2/g$ to about 700 $m^2/g$, a pore volume in the range of from about 0.1 cc/g to about 4.0 cc/g and an average particle size in the range of from about 5 μm to about 500 μm. More preferably, the support material can have a surface area in the range of from about 50 $m^2/g$ to about 500 $m^2/g$, pore volume of from about 0.5 cc/g to about 3.5 cc/g and average particle size of from about 10 μm to about 200 μm. The surface area can range from a low of about 50 $m^2/g$, 150 $m^2/g$, or 300 $m^2/g$ to a high of about 500 $m^2/g$, 700 $m^2/g$, or 900 $m^2/g$. The surface area also can range from a low of about 200 $m^2/g$, 300 $m^2/g$, or 400 $m^2/g$ to a high of about 600 $m^2/g$, 800 $m^2/g$, or 1,000 $m^2/g$. The average pore size of the support material can range of from about 10 Å to 1000 Å, about 50 Å to about 500 Å, about 75 Å to about 350 Å, about 50 Å to about 300 Å, or about 75 Å to about 120 Å.

The zeolite catalyst, as described herein, can convert light hydrocarbon alkenes to higher molecular weight oligomers. The light hydrocarbons or hydrocarbon feed stream can be or can include natural gas, natural gas liquids, or mixtures of both. The hydrocarbon feed stream can be derived directly from shale gas or other formations. The hydrocarbon feed stream can also originate from a refinery, such as from a fluid catalytic cracking (FCC) unit, coker, steam cracker, and pyrolysis gasoline (pygas) as well as alkane dehydrogenation processes, for example, ethane, propane and butane dehydrogenation.

The hydrocarbon feed stream can be or can include one or more olefins having from about 2 to about 12 carbon atoms. The hydrocarbon feed stream can be or can include one or more linear alpha olefins, such as ethene, propene, butenes, pentenes and/or hexenes. The process is especially applicable to ethene and propene oligomerization for making C4 to about C26 oligomers.

The hydrocarbon feed stream can contain greater than about 65 wt % olefins, such as greater than about 70 wt. % olefins or greater than about 75 wt % olefins. For example, the hydrocarbon feed stream can contain one or more C2 to C12 olefins in amounts ranging from a low of about 50 wt %, 60 wt % or 65 wt % to a high of about 70 wt %, 85 wt % or 100 wt %, based on the total weight of the feed stream. The hydrocarbon feed stream also can include up to 80 mol % alkanes, for example, methane, ethane, propane, butane, and pentane; although the alkane generally comprises less than about 50 mol % of the hydrocarbon feed stream, and preferably less than about 20 mol % of the hydrocarbon stream.

The resulting oligomer(s) can be or can include one or more olefins having from 4 to 26 carbon atoms, such as 12 to 20 carbon atoms, or 16 to 20 carbon atoms. The resulting oligomers, for example, can include butene, hexene, octene, decene, dodecene, tetradecane, hexadecane, octadecene and eicosene and higher olefins, as well as any combinations thereof. The resulting oligomer(s) also can have less than about 5% aromatics and less than about 10 ppm sulfur. The resulting oligomer(s) also can have zero or substantially no aromatics and zero or substantially no sulfur.

The resulting oligomer(s) can be useful as precursors, feedstocks, monomers and/or comonomers for various commercial and industrial uses including polymers, plastics, rubbers, elastomers, as well as chemicals. For example, these resulting oligomer(s) are also useful for making polybutene-1, polyethylene, polypropylene, polyalpha olefins, block copolymers, detergents, alcohols, surfactants, oilfield chemicals, solvents, lubricants, plasticizers, alkyl amines, alkyl succinic anhydrides, waxes, and many other specialty chemicals.

The resulting oligomer(s) can be especially useful for production of diesel and jet fuels, or as a fuel additive. In certain embodiments, the resulting oligomer(s) can have a boiling point in the range of 170° C. to 360° C. and more particularly 200° C. to 300° C. The resulting oligomer(s) also can have a Cetane Index (CI) of 40 to 100 and more particularly 65 to 100. The resulting oligomer(s) also can have a pour point of −50° C. or −40° C.

The oligomerization process can be carried out using any conventional technique. The process can be carried out, for example, in a continuous stirred tank reactor, batch reactor or plug flow reactor. One or more reactors operated in series or parallel can be used. The process can be operated at partial conversion to control the molecular weight of the product and unconverted olefins can be recycled for higher yields.

During oligomerization, the zeolite catalyst can be used alone or can be used with one or more promoters, and one or more co-catalysts or activators. The term promoter refers to any metal that can be added to the acid-form zeolite to provide another catalytically active compound, such as Nickel. The terms "co-catalyst" and "activator" are used herein interchangeably and refer to any compound, other than the reacting olefin, that can added to the acid-form or metal/acid-form zeolite to further promote the reaction. For example, the following co-catalyst and/or activators can optionally be used: alumoxanes, aluminum alkyls, ionizing activators, which may be neutral or ionic, alumoxane compounds, modified alumoxane compounds, and ionizing anion precursor compounds that abstract one reactive, σ-bound, metal ligand making the metal complex cationic and providing a charge-balancing noncoordinating or weakly coordinating anion. Once the zeolite catalyst is deactivated with high molecular weight carbon, or coke, it can be regenerated using known techniques in the art, including for example, by combustion in air or nitrogen at a temperature of about 400° C. or higher.

EXAMPLES

Embodiments discussed and described herein can be further described with the following examples. Numerous MFI samples were prepared to illustrate the effects of crystallization, topology and framework structure. All zeolite synthesis recipes are listed in Table 1. Although the following examples are directed to specific embodiments, they are not to be viewed as limiting in any specific respect.

Zeolite Synthesis

Samples 1-9 were crystallized with a mixture of $Na^+$, methylamine (MEA) and 1,4-diazabicyclo[2.2.2]octane (DABCO), with each having different Al content. The synthesis gel molar ratios were 1 $SiO_2$/0.0036-0.04 $Al_2O_3$/0.36 DABCO/0.36 MEA/0.014 $Na_2O$/13.2 $H_2O$. To prepare these samples, 3.055 g of DABCO (Sigma Aldrich, 99%) was added to a solution of 8.841 g deionized water (18.2 MΩ) and 2.094 g methylamine (MEA, Sigma Aldrich, 40 wt. % in water), and was stirred for 30 minutes. Then 0.0856 g of sodium hydroxide (Macron, 98%), 0.3903 g of aluminum isoproproxide (Sigma Aldrich, 98%) and 15 g of colloidal silica (Ludox HS-30, Sigma Aldrich, 30 wt. % in water) were added. The solution was stirred at ambient conditions for 4 hr and then loaded into a 45 mL Teflon liner and stainless-steel autoclave, and placed in a static oven at 413 K for 16 days.

Samples 10 and 20-24 were made without Na purposefully added to the synthesis gel. The ratios of DABCO and MEA were 1 $SiO_2$/0.0125 $Al_2O_3$/0.36 DABCO/0.72-1.44 MEA/13.2 $H_2O$. These synthesis gels resulted in crystallizing MFI zeolites.

Samples 11-19 were made with varying amounts of $Na^+$, MEA, and DABCO with specific ratios of 1 $SiO_2$/0.0125 $Al_2O_3$/0.09-1.44 DABCO/0.09-1.44 MEA/0.00035-0.0056 $Na_2O$/13.2 $H_2O$.

Sample 23 was made without DABCO and $Na^+$ and had molar ratios of 1 $SiO_2$/0.0125 $Al_2O_3$/0.36 MEA/13.2 $H_2O$. This synthesis gel resulted in crystallizing MFI zeolites.

Sample 25 is a comparative MFI (ZSM-5) zeolite sample made using $TPA^+$ as the SDA and was prepared using synthesis gel molar ratios of 1 $SiO_2$/0.003-0.016 $Al_2O_3$/0.611 TPAOH/0 $Na_2O$/44 $H_2O$, where the Si/Al ratio in the gel was varied between 30-150 at a constant TPAOH/Si ratio of 0.611. A mixture of 3.32 g of tetrapropylammonium hydroxide (TPAOH) (Sigma Aldrich, 40 wt. %) and 19.20 g of deionized water (18.2 MΩ) was prepared in a perfluoroalkoxy alkane jar (PFA, Savillex Corp.) and stirred for 15 minutes at ambient conditions. Then, 0.20 g of $Al(OH)_3$ (SPI Pharma, 99%) was added to the synthesis mixture and stirred under ambient conditions for 15 minutes, followed by the addition of 3.5 g of amorphous silica (Cabosil, 99%). The solution was then stirred at ambient conditions for 16 hours. The solution was then transferred to 45 mL Teflon lined stainless-steel autoclaves (Parr Instruments) and placed in a forced convection oven (Yamato DKN-402C) at 433 K for 5 days.

Samples 26-30 are more comparative MFI (ZSM-5) zeolite samples that were crystallized using both $Na^+$ and $TPA^+$ as co-SDAs. Different $Na^+$/$TPA^+$ ratios were used in synthesis gels with molar ratios of 1 $SiO_2$/0.01 $Al_2O_3$/0.10-0.611 TPAOH/0-0.26 $Na_2O$/44 $H_2O$/0.611 OH. The typical synthesis procedure started by preparing a mixture of 3.32 g of tetrapropylammonium hydroxide (TPAOH) (Sigma Aldrich, 40 wt. %) and 19.20 g of deionized water (18.2 MΩ) in a PFA jar, and stirring for 15 minutes at ambient conditions. Then, 0.20 g of $Al(OH)_3$ (SPI Pharma, 99%) was added to the synthesis mixture and stirred under ambient conditions for 15 minutes, followed by the addition of 5.25 g of a 5 M NaOH solution (16.3 wt. %) and 3.5 g of amorphous silica (Cabosil M-5, 99%). The solution was then stirred at ambient conditions for 16 hours. The solution was then transferred to 45 mL Teflon lined stainless-steel autoclaves and placed in the forced convection oven at 433 K for 5 days.

TABLE 1

Synthesis recipes attempted and resulting crystalline phase

| Sample Number | SiO$_2$ | Al$_2$O$_3$ | DABCO | MEA | TPA | Na$_2$O | Water | Result |
|---|---|---|---|---|---|---|---|---|
| 1 | 1 | 0.04 | 0.36 | 0.36 | — | 0.014 | 13.2 | MFI |
| 2 | 1 | 0.025 | 0.36 | 0.36 | — | 0.014 | 13.2 | MFI |
| 3 | 1 | 0.025 | 0.36 | 0.36 | — | 0.014 | 13.2 | MFI |
| 4 | 1 | 0.0125 | 0.36 | 0.36 | — | 0.014 | 13.2 | MFI |
| 5 | 1 | 0.0125 | 0.36 | 0.36 | — | 0.014 | 13.2 | MFI |
| 6 | 1 | 0.00833 | 0.36 | 0.36 | — | 0.014 | 13.2 | MFI |
| 7 | 1 | 0.00667 | 0.36 | 0.36 | — | 0.014 | 13.2 | MFI |
| 8 | 1 | 0.005 | 0.36 | 0.36 | — | 0.014 | 13.2 | MFI |
| 9 | 1 | 0.00375 | 0.36 | 0.36 | — | 0.014 | 13.2 | MFI |
| 10 | 1 | 0.0125 | 0.36 | 0.36 | — | 0 | 13.2 | MFI* |
| 11 | 1 | 0.0125 | 0.36 | 0.36 | — | 0.00035 | 13.2 | MFI* |
| 12 | 1 | 0.0125 | 0.36 | 0.36 | — | 0.0007 | 13.2 | MFI |
| 13 | 1 | 0.0125 | 0.36 | 0.36 | — | 0.028 | 13.2 | MFI |
| 15 | 1 | 0.0125 | 0.36 | 0.36 | — | 0.056 | 13.2 | MFI |
| 16 | 1 | 0.0125 | 0.09 | 0.09 | — | 0.014 | 13.2 | MFI* |
| 17 | 1 | 0.0125 | 0.18 | 0.18 | — | 0.014 | 13.2 | MFI |
| 18 | 1 | 0.0125 | 0.72 | 0.72 | — | 0.014 | 13.2 | MFI |
| 19 | 1 | 0.0125 | 1.44 | 1.44 | — | 0.014 | 13.2 | Amorphous |
| 20 | 1 | 0.0125 | 0.36 | 0.15 | — | 0 | 13.2 | Amorphous |
| 21 | 1 | 0.0125 | 0.36 | 0.72 | — | 0 | 13.2 | MFI |
| 22 | 1 | 0.0125 | 0.36 | 1.44 | — | 0 | 13.2 | MFI |
| 23 | 1 | 0.0125 | 0 | 0.36 | — | 0 | 13.2 | MFI |
| 24 | 1 | 0.025 | 0.36 | 0.36 | — | 0 | 13.2 | MFI |
| 25 | 1 | 0.01 | — | — | 0.61 | 0 | 44 | MFI |
| 26 | 1 | 0.01 | — | — | 0.49 | 0.06 | 44 | MFI |
| 27 | 1 | 0.01 | — | — | 0.37 | 0.12 | 44 | MFI |
| 28 | 1 | 0.01 | — | — | 0.24 | 0.19 | 44 | MFI |
| 29 | 1 | 0.01 | — | — | 0.15 | 0.23 | 44 | MFI |
| 30 | 1 | 0.01 | — | — | 0.10 | 0.25 | 44 | MFI |

Partially Amorphous

In all cases, after zeolite crystallization was quenched, solids were washed in deionized water and acetone alternating until the pH was constant between washes. Solids were recovered via centrifugation and then dried at 373 K for 24 h under stagnant air.

Zeolite Characterization

The framework structures of Samples 1-30 were determined by powder X-ray diffraction (XRD) measured on a Rigaku SmartLab X-ray diffractometer operated at 1.76 kW with a Cu Kα radiation source (λ=0.154 nm). Approximately 0.01-0.03 g of dried sample were loaded into a zero-background, low dead-volume sample holder (Rigaku) and the diffraction pattern was measured from 4-40° 2θ at a rate of 0.0167° s$^{-1}$.

FIG. 1 shows the XRD pattern for Samples 4 and 5. The patterns are consistent with that expected for the MFI topology.

Figure 2:
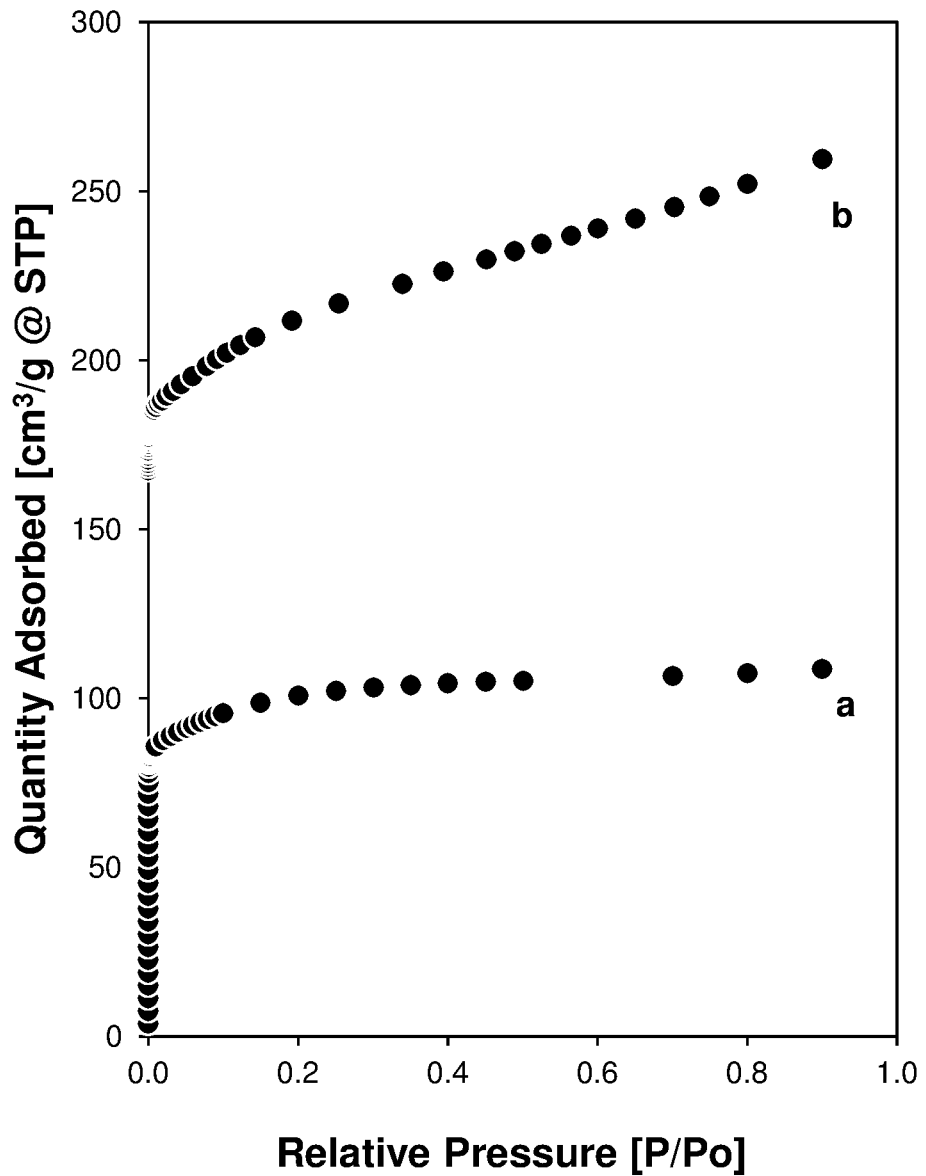
FIG. 2 shows $N_2$ adsorption isotherms (77 K) for the same MFI samples shown in FIG. 1 (Samples 4 and 5). Isotherms are vertically offset by 100 $cm^3$ $g^{-1}$ @ STP for clarity.

FIG. 2 shows N$_2$ isotherms for Samples 4 and 5, and shows the adsorption behavior expected of the MFI framework topology. Micropore volumes were determined from N$_2$ adsorption isotherms measured on H-MFI samples held at 77 K using Micromeritics ASAP 2020. Approximately 0.02-0.05 g of zeolite samples were pressed and sieved to uniform size (180-250 μm), then degassed by heating under vacuum (<5 mmHg) to 393 K (0.167 K s$^{-1}$) for 2 hours, then heated and held to 623 K (0.167 K s$^{-1}$) for 9 hours. The uptake of liquid N$_2$ at 0.05-0.35 P/P$_o$ was extrapolated to zero pressure to estimate micropore volumes.

Figure 3:
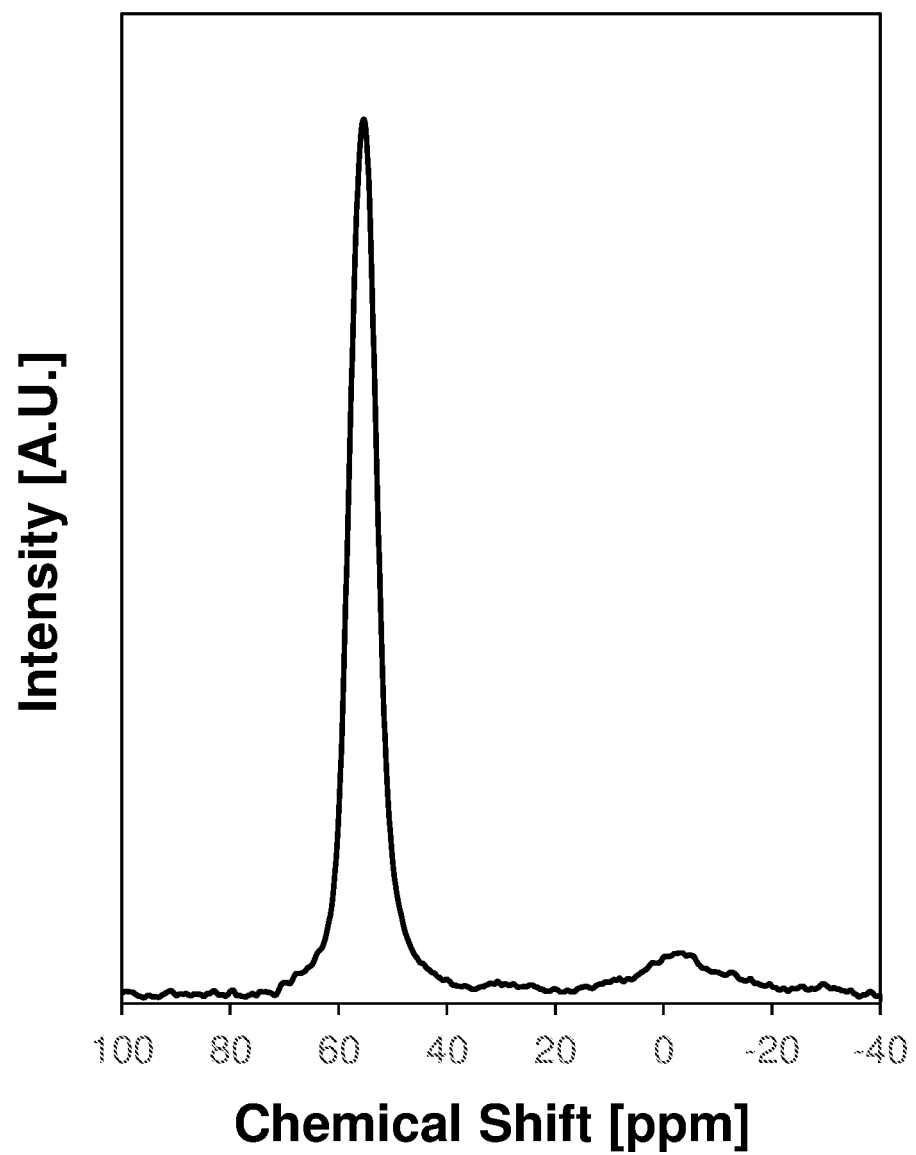
FIG. 3 shows an Al MAS NMR spectrum on Sample 4.

FIG. 3 shows an exemplary Al MAS NMR spectrum for Sample 4 that was made with DABCO, MEA, and Na$^+$. The H-MFI samples were hydrated for a minimum of 24 hours in a desiccator containing saturated potassium chloride and Al magic angle spinning nuclear magnetic resonance (MAS NMR) spectra were measured on the samples. The Al NMR spectra were collected using a Chemagnetics CMX-Infinity 400 spectrometer in a wide-bore 9.4 T magnet (Purdue Interdepartmental NMR Facility) and were acquired at ambient conditions using a 2.3 μs pulse, an acquisition time of 12.8 ms, and a relaxation delay of is and were measured at 104.24 MHz and a MAS rate of 5 kHz.

Figure 4:
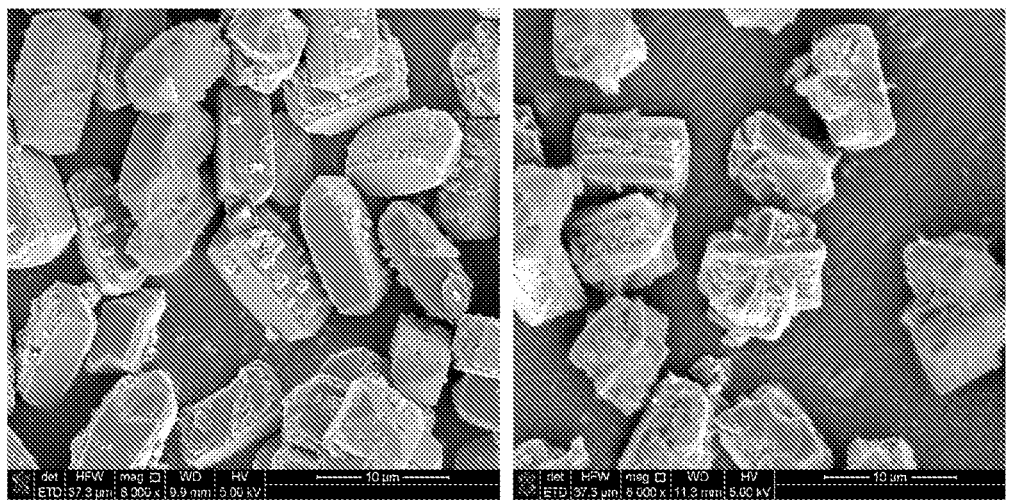
FIG. 4 depicts two SEM images for Sample 4 and Sample 24.

FIG. 4 depicts SEM images for Sample 4 and Sample 24. Crystallites were imaged using scanning electron microscopy (SEM) using an FEI Quanta 3D FEG Dual-beam SEM system. Prior to imaging, samples were coated with platinum to reduce charging Images were taken at 5000× to 15,000× magnification with an accelerating voltage of 20 kV and spot size of 6 μm.

Elemental analysis to measure Na, Al, and Co content was performed using atomic absorbance spectroscopy on a PerkinElmer Model Analyst 300 spectrometer. Samples were prepared by digesting 0.01-0.02 g of zeolite powder in 2.5 g of a 48 wt. % hydrofluoric acid solution for at least 24 h, followed by dilution in approximately 50 g of deionized water. Absorbance values for Al, Na, and Co were respectively measured at 309.3 nm in a reducing acetylene nitrous oxide flame and 589.0 and 240.7 nm in an oxidizing acetylene/air flame. Calibrations and known standards were used to determine element concentrations for each sample. Si contents were not measured by AAS; the Si/Al ratio for each sample was calculated from the measured Al content and the unit cell formula.

The number of framework Al sites in close enough proximity to charge-compensate a divalent cation was estimated using liquid-phase Co$^{2+}$ ion exchange. The exchange protocol used (0.5 M Co(NO$_3$)$_2$, 353 K, 24 h, on Na-form MFI samples). This exchange protocol was verified to result in saturation Co$^{2+}$ ion exchange, and only isolated Co$^{2+}$ species (and not Co-oxides) were exchanged as verified by a cation site balance to provide evidence for a 2:1 $Co^{2+}$ exchange stoichiometry at saturation and DRUV-Vis spectra of the dehydrated Co-MFI.

Figure 7:
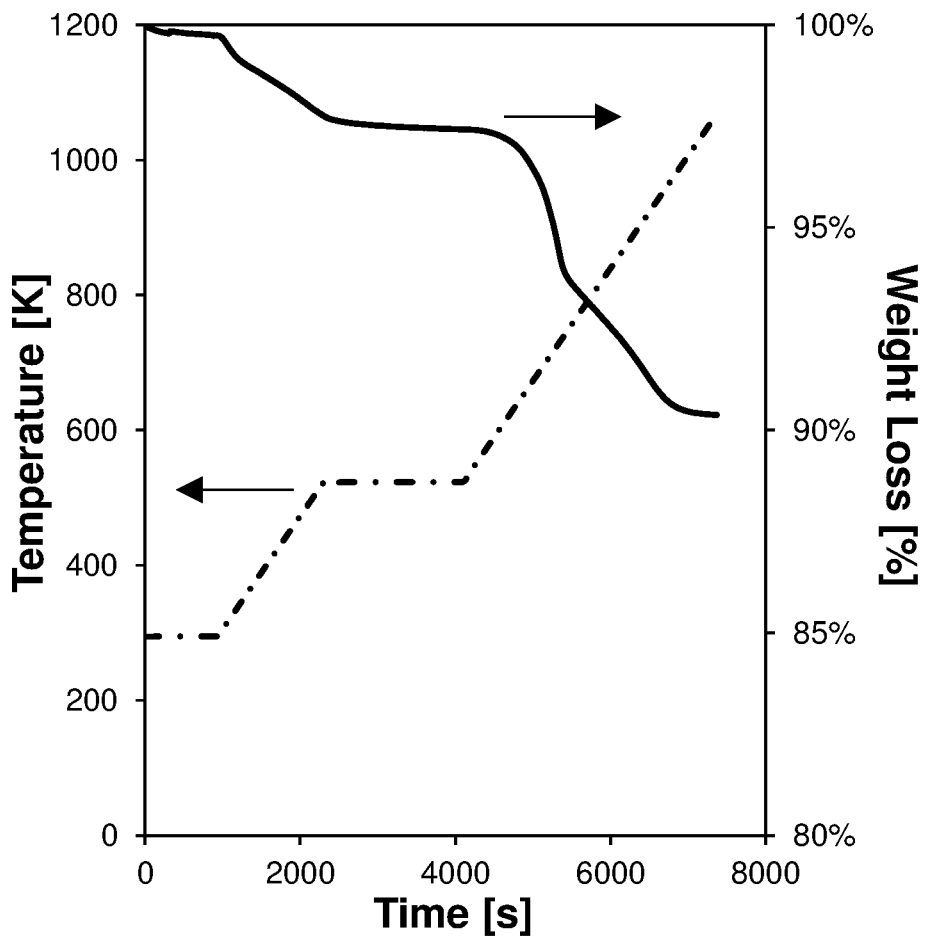
FIG. 7 shows a thermogravimetric analysis (TGA) profile on Sample 5, which is used to determine the OSDA content incorporated into the crystallized solids.

FIG. 7 shows a thermogravimetric analysis (TGA) profile on Sample 5, which is used to determine occluded organic content on the as-synthesized solids. Thermogravimetric analysis (TGA) on a TA Instruments SDT Q600 thermogravimetric analyzer and differential scanning calorimeter (TGA-DSC) was used to measure organic weight loss on the as-made zeolite solids. From the total organic content, the amount of OSDA oocluded within each unit cell of the MFI crystal structure can help understand how the OSDA is situated in the internal pore spaces to guide crystallization toward the MFI crystal phase. TGA estimates of the OSDA per unit cell (4.24 and 3.69 OSDA per unit cell for samples 4 and 5, respectively) indicate that each MFI channel intersection was filled with one DABCO molecule, suggesting the DABCO molecule sufficiently serves as a space-filling OSDA to guide crystallization toward the MFI crystal phase.

To measure weight loss, 0.01-0.02 g of each sample was heated in flowing dry air (83.3 $cm^3$ $s^{-1}$, UHP, 99.999%, Indiana Oxygen) to 523 K (0.167 K $s^{-1}$) and held for 0.5 hr to remove adsorbed water, before additional heating to 1073 K (0.167 K $s^{-1}$) to combust the occluded organic content. The weight loss during the second temperature ramp (523-1073 K) was taken to be the organic content.

Ammonia temperature-programmed desorption ($NH_3$ TPD) was used to quantify the number of $H^+$ sites on H-form and Co-form MFI samples with a Micromeritics AutoChem II 2920 Chemisoption analyzer and an Agilent 5973N mass-selective detector (MSD) system. To quantify the number of $H^+$ sites, 0.03-0.06 g of $NH_4$-form and Co-form MFI samples were pelleted and sieved to retain a particle size between 180-250 μm, and then supported between two quartz wool plugs in a quartz reactor. To quantify total $H^+$ sites on $NH_4$-form MFI, samples were held at 323 K for 0.5 hr under flowing He (15 $cm^3$ $s^{-1}$ (g solid)$^{-1}$, UHP, 99.999%, Indiana Oxygen), followed by increasing the temperature to 873 K (0.167 K $s^{-1}$) while the effluent gas was sent to the MSD system for analysis.

To quantify residual $H^+$ sites on Co-form, MFI samples were treated in an oxidative environment (dry air at 0.833 $cm^3$ $s^{-1}$, UHP, 99.999%, Indiana Oxygen, to 673 K for 2 h, 0.167 K $s^{-1}$), and $NH_3$ titration of $H^+$ sites was performed using a gas-phase titration method in which samples were first exposed to flowing $NH_3$ (20 $cm^3$ $s^{-1}$ $g^{-1}$, 500 ppm $NH_3$ in balance He, Matheson) at 433 K for 4 h, and then to a flowing wet He stream (~3% $H_2O$, 20 $cm^3$ $s^{-1}$ $g^{-1}$) at 433 K for 8 h in order to desorb $NH_3$ bound at non-protonic sites. Argon pulses of known molar quantities were used to determine a response factor ($NH_3$/Ar), and an Ar pulse introduced after each $NH_3$ TPD experiment was used to quantify the amount of $NH_3$ evolved during the experiment.

Notably, Samples 4 and 5 resulted in a solid, crystallized MFI product with a Si/Al ratio of 44. It was surprisingly and unexpectedly discovered that this synthesis gel was able to crystallize MFI zeolites. The use of DABCO as a reagent had been known to crystallize Beta zeolites, but not MFI zeolites. MFI had been observed to be a minor crystal phase that forms under certain conditions from DABCO-containing synthesis gels, but only when boron is present in the mixture. No boron was present or intentionally added in these samples.

To illustrate the unexpected effects of using charge-neutral OSDAs together with Na in zeolite synthesis media on the resulting Al distribution in the MFI, Table 2 below shows the structural and site characterization of MFI Samples 25-30 that were made with $TPA^+$ or $TPA^+$ together with $Na^+$. Again, no boron was present, or intentionally added, to these samples. The resulting zeolite framework topologies of the zeolites synthesized with $TPA^+$ only (Sample 25) and the zeolites synthesized with Na and $TPA^+$ (Samples 26-30) were consistent with the MFI framework topology of the zeolites synthesized with DABCO, MEA, and $Na^+$ present MFI Samples 4-5.

TABLE 2

| Sample | Micropore Volume ($cm^3$ $g^{-1}$)$^a$ | Si/Al$^b$ | Al per unit cell | Al$_f$/Al$_{tot}$$^c$ | $H^+$/Al$_{tot}$$^d$ | $H^+$/Al$_f$$^c$ | $Co^{2+}$/Al$_{tot}$$^e$ | Fraction of Al in Pairs$^f$ |
|---|---|---|---|---|---|---|---|---|
| 25 | 0.15 | 49.8 | 1.89 | 0.93 | 1.01 | 1.09 | 0.12 | 0.24 |
| 26 | 0.13 | 51.6 | 1.86 | — | 1.09 | — | 0.06 | 0.12 |
| 27 | 0.15 | 56.7 | 1.69 | 0.96 | 1.10 | — | 0.11 | 0.22 |
| 28 | 0.15 | 50.8 | 1.89 | 0.94 | 0.82 | 0.87 | 0.12 | 0.24 |
| 29 | 0.13 | 57.5 | 1.67 | 0.97 | 1.13 | 1.16 | 0.22 | 0.44 |
| 30 | 0.13 | 54.5 | 1.76 | 0.95 | 0.97 | 1.02 | 0.22 | 0.44 |
| 4 | 0.13 | 44.1 | 2.08 | 0.89 | — | — | 0.03 | 0.06 |
| 5 | 0.13 | 44.2 | 2.07 | — | 0.95 | — | 0.07 | 0.14 |

$^a$Micropore volumes determined from N2 adsorption isotherms at 77K (Section S.2, SI).
$^b$Si/Al ratios determined on H-form zeolites using AAS.
$^c$Determined by $^{27}$Al MAS NMR (Section S.3, SI). Uncertainties are ±10%.
$^d$Determined with liquid-phase NH4+ ion-exchange followed by TPD (Section S.4, SI). Uncertainties are ±0.05.
$^e$Quantification of proximal Al sites by Co2+ titration using methods described in Section 3.2.1 and S7.
$^f$Fraction of Al in pairs, calculated by 2*Co2+/Altot.

The chemical structures for the OSDAs used to crystallize MFI in the presence of $Na^+$ cations are shown below:

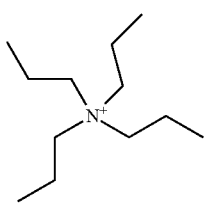 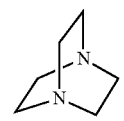

Tetrapropylammonium ($TPA^+$)     1,4-diazabicyclo[2.2.2]octane (DABCO)

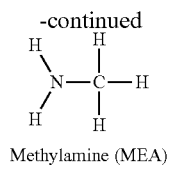

Methylamine (MEA)

Figure 5:
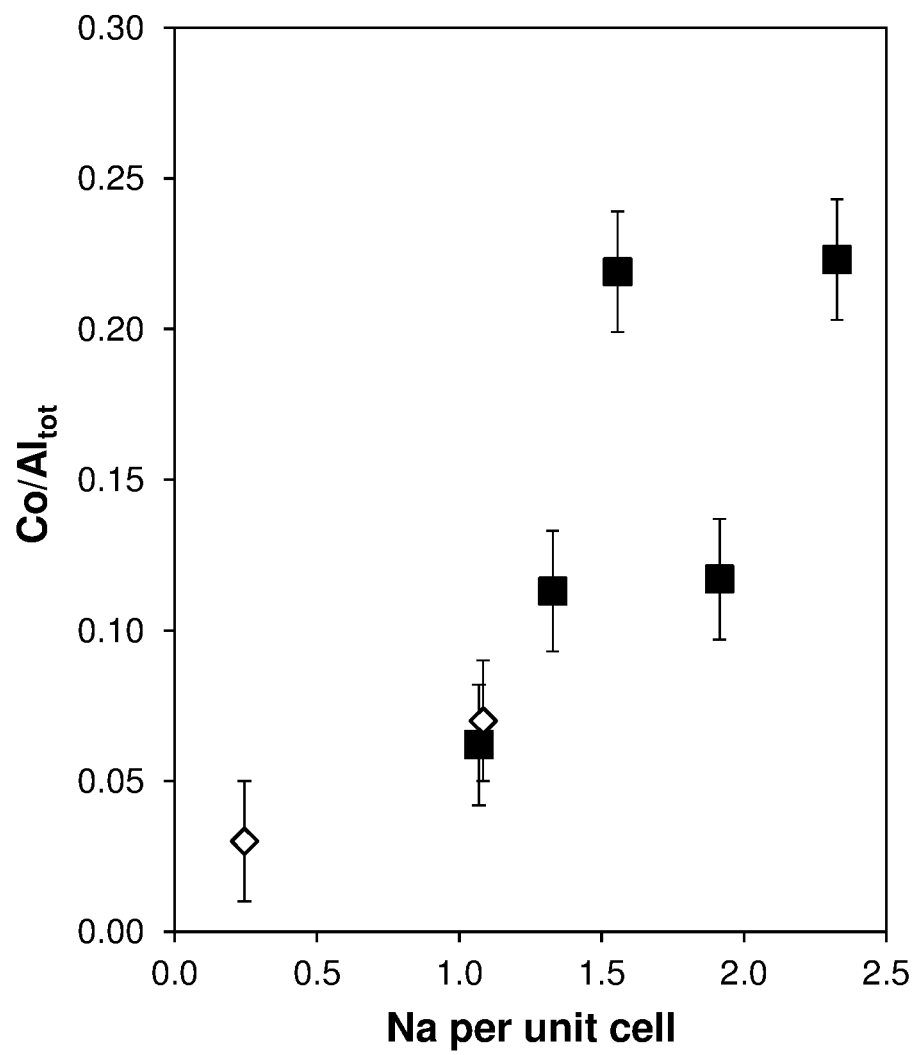
FIG. 5 shows how the paired Al content ($Co^{2+}$-titratable Al—Al pairs) increases with the $Na^+$ content that is retained on solid MFI samples (after crystallization) of similar Si/Al ratio (44-58) synthesized with DABCO and methylamine (open diamonds) compared to samples made with $TPA^+$ (filled squares) as the primary OSDA.

FIG. 5 shows the dependence of the number of Al—Al pairs titrated by $Co^{2+}$ among MFI samples of similar Si/Al ratio (44-58) on the $Na^+$ content retained on the crystalline product for the samples synthesized with DABCO (open diamonds) and $TPA^+$ (filled squares) as the primary OSDA. The data in FIG. 5 shows the MFI samples containing similar bulk Al content (Si/Al=44-58), allowing for direct comparisons of the influence of cationic ($TPA^+$) and charge-neutral (DABCO, MEA) OSDAs when used together with Na as an inorganic co-SDA. The $Na^+$ content occluded in the solid MFI products crystallized using cationic and charge-neutral co-SDAs generally correlated to the amount of proximal Al—Al site pairs formed (FIG. 5). Such low contents of occluded $Na^+$ in MFI crystallized using charge-neutral OSDAs (<1 per unit cell, FIG. 5) are typically not observed in literature (3.8-4.8 Na per unit cell).[35]

TGA estimates of the OSDA per unit cell for Samples 4 and 5 were estimated at 4.24 and 3.69, respectively. These TGA estimates indicate that each MFI intersection was filled with one DABCO compound.

Differences in the amount of occluded Na on the crystalline solids (FIG. 5) was found, as well as significantly lower Na content (0.25 Na per unit cell, FIG. 5) than on any of the MFI-TPA samples. The fraction of proximal Al formed on Samples 4-5 (i.e., the DABCO-assisted MFI materials) showed a positive correlation with the amount of $Na^+$ occluded on the solid products (FIG. 5), similar to the MFI-TPA series (FIG. 5). The $Na^+$/OSDA ratios used in the synthesis media to crystallize an MFI product with a specific amount of occluded Na per unit cell (e.g., ~1; FIG. 5) was significantly lower for the case of DABCO (0.04) than $TPA^+$ (0.25-5), illustrating that crystallizing MFI zeolites with a targeted amount of proximal Al sites can require different relative amounts of inorganic and organic SDAs in the synthesis mixture, providing opportunities to design routes that do so while minimizing OSDA usage, if so desired.

Figure 6:
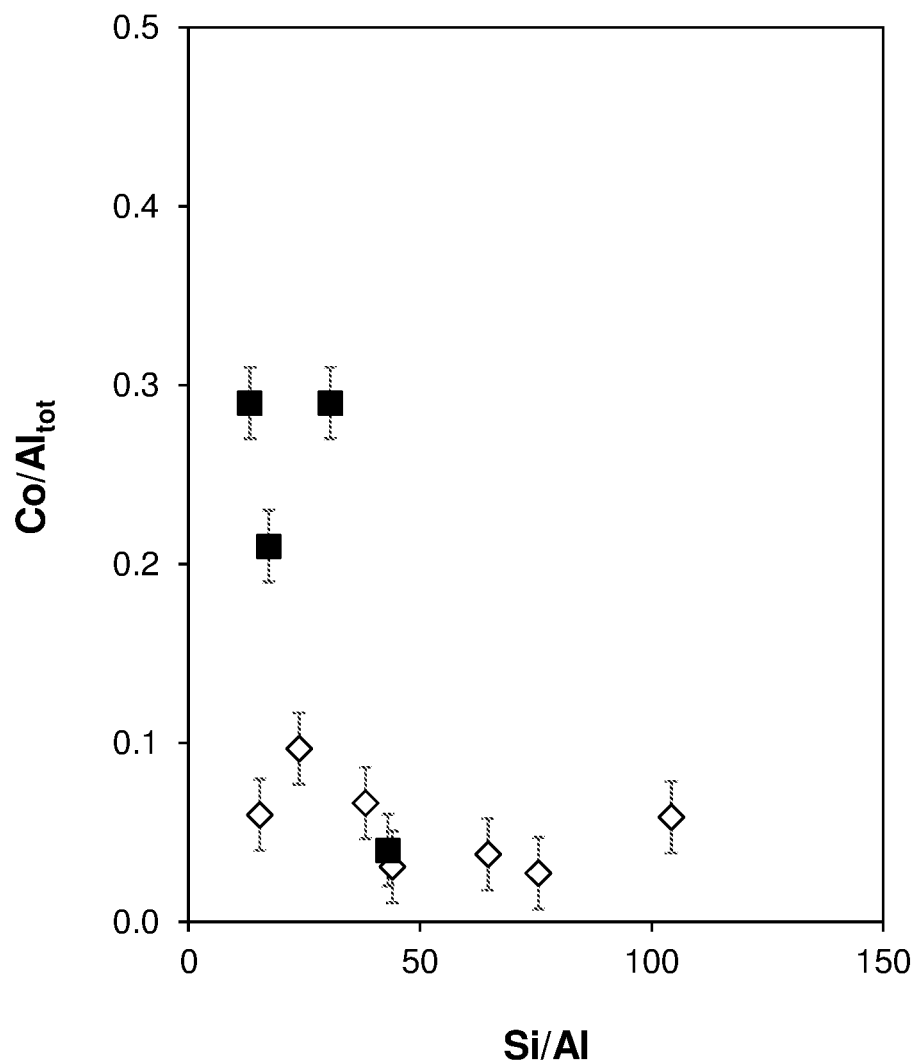
FIG. 6 shows how the paired Al content ($Co^{2+}$-titratable Al—Al pairs) depends on varying bulk Al content among MFI samples made with DABCO and methylamine (open diamonds) compared to commercially sourced MFI samples from Zeolyst International (filled squares).

FIG. 6 shows the number of paired Al sites quantified by $Co^{2+}$ exchange on a series of DABCO-synthesized MFI samples at varying Si/Al ratio (samples listed in Table 1), compared against for commercial MFI samples obtained from Zeolyst International (at four different Si/Al ratios). For the three Zeolyst MFI samples at the lowest Si/Al ratios (<35, first three filled squares), the equivalent DABCO-synthesized MFI samples at these Si/Al ratios contained significantly fewer paired Al sites.

FIG. 6 illustrates the dependence of the Al—Al pairs titrated by $Co^{2+}$ among the MFI samples made with DABCO and methylamine (constant DABCO/Si, methylamine/Si, Na/Si; varying Si/Al) (open diamonds). Commercially sourced ZSM-5 samples from Zeolyst International are also included for reference (filled squares).

The above results show the addition of both DABCO and methylamine together (but not when present alone) to zeolite synthesis gels can unexpectedly crystallize MFI zeolites. Moreover, the resulting MFI zeolites contain a higher content of isolated framework Al atoms than MFI samples of similar bulk composition but synthesized with $TPA^+$ or $TPA^+/Na^+$. The presence of isolated Al atoms is beneficial and desirable for certain catalytic and adsorption applications.

The above results further illustrate that aluminosilicate gels containing DABCO and methylamine SDAs, when $Na^+$ is also in the synthesis medium, can surprisingly and unexpectedly crystallize ZSM-5 zeolites (i.e., those having MFI framework topology). The above results further illustrate that ZSM-5 zeolites made according to the embodiments provided herein, primarily contain isolated Brønsted acid sites, as measured by negligible uptake of $Co^{2+}$ by ion exchange, compared to ZSM-5 zeolites of similar bulk composition (Si/Al ratio) but instead crystallized using $TPA^+$ or mixtures of $TPA^+$ and $Na^+$. This was all accomplished in the absence of boron, or at least without the intentional addition of boron.

In the above detailed description, the specific embodiments of this disclosure have been described in connection with its preferred embodiments. However, to the extent that the above description is specific to a particular embodiment or a particular use of this disclosure, this is intended to be illustrative only and merely provides a concise description of the exemplary embodiments. Accordingly, the disclosure is not limited to the specific embodiments described above, but rather, the disclosure includes all alternatives, modifications, and equivalents falling within the true scope of the appended claims. Various modifications and variations of this disclosure will be obvious to a worker skilled in the art and it is to be understood that such modifications and variations are to be included within the purview of this application and the spirit and scope of the claims.

All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, meaning the values take into account experimental error, machine tolerances and other variations that would be expected by a person having ordinary skill in the art.

The foregoing has also outlined features of several embodiments so that those skilled in the art can better understand the present disclosure. Those skilled in the art should appreciate that they can readily use the present disclosure as a basis for designing or modifying other methods or devices for carrying out the same purposes and/or achieving the same advantages of the embodiments disclosed herein. Those skilled in the art should also realize that such equivalent constructions do not depart from the spirit and scope of the present disclosure, and that they can make various changes, substitutions, and alterations herein without departing from the spirit and scope of the present disclosure, and the scope thereof is determined by the claims that follow.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for making a zeolite having MFI framework topology, comprising:
    adding a source of 1,4-diazabicyclo[2.2.2]octane (DABCO), methylamine (MEA) and sodium (Na) to water to form a homogenized aqueous solution;
    adding a source of aluminum to the homogenized aqueous solution to form an aluminum-containing intermediate agent;
    adding a source of silicon to the aluminum-containing intermediate agent to form a synthesis gel;
    subjecting the synthesis gel to conditions sufficient to crystallize a MFI zeolite; and
    recovering the crystallized MFI zeolite.

2. The method of claim 1, wherein the source of silicon is silica and the amount of DABCO in grams per gram of silica is about 0.1 to about 1.0.

3. The method of claim 1, wherein the source of silicon is silica and the amount of MEA in grams per gram of silica is about 0.1 to about 2.0.

4. The method of claim 1, wherein the source of silicon is silica and the amount of sodium (Na) in grams per gram of silica is about 0.0001 to about 0.15.

5. The method of claim 1, wherein the source of silicon is silica, the source of aluminum is alumina, and the amount of alumina in grams per gram of silica is about 0.014 to about 0.15.

6. The method of claim 1, wherein the MFI zeolite is an acid-form zeolite having an MFI framework topology.

7. The method of claim 6, wherein the MFI zeolite has a ratio of Si to Al (Si:Al) of about 30 to about 100, and a surface area of about 100 $m^2/g$ to about 600 $m^2/g$.

* * * * *